United States Patent
Lane, III et al.

[11] Patent Number: 5,983,799
[45] Date of Patent: *Nov. 16, 1999

[54] REPLACEABLE SLEEVE

[75] Inventors: William James Lane, III, Black Mountain; Michael Edward McLean; Thomas Gerald Ferguson, both of Waynesville, all of N.C.

[73] Assignee: Day International, Inc., Dayton, Ohio

[*] Notice: This patent is subject to a terminal disclaimer.

[21] Appl. No.: 09/151,913

[22] Filed: Sep. 11, 1998

Related U.S. Application Data

[63] Continuation of application No. 08/758,808, Dec. 4, 1996, Pat. No. 5,860,360.

[51] Int. Cl.$^6$ .............................. B41F 27/00; B41F 30/00
[52] U.S. Cl. .................. 101/375; 101/376; 101/401.1; 492/50; 492/56
[58] Field of Search ................................ 101/216, 217, 101/218, 375, 376, 401.1; 492/18, 48, 49, 50, 51, 52, 56; 428/909

[56] References Cited

U.S. PATENT DOCUMENTS

| | | | |
|---|---|---|---|
| 1,659,371 | 2/1928 | Merrill | 492/43 |
| 1,691,336 | 11/1928 | Casto | 101/217 |
| 1,804,139 | 5/1931 | Adsit et al. | 101/217 |
| 2,076,376 | 4/1937 | Lewis et al. | 428/909 |
| 2,193,899 | 3/1940 | Casto et al. | 156/160 |
| 3,043,211 | 7/1962 | Appenzeller | 492/5 |
| 3,146,709 | 9/1964 | Bass et al. | 101/375 |
| 3,152,387 | 10/1964 | Macleod | 492/56 |
| 3,263,606 | 8/1966 | Poynter | 101/179 |
| 3,467,009 | 9/1969 | Ross | 101/216 |
| 3,733,233 | 5/1973 | Griffiths | 156/153 |
| 3,881,045 | 4/1975 | Strunk | 428/909 |
| 3,928,521 | 12/1975 | Haren | 101/348 |
| 3,983,287 | 9/1976 | Goossen et al. | 428/909 |
| 4,030,415 | 6/1977 | Fellows | 101/382.1 |
| 4,144,812 | 3/1979 | Julian | 101/375 |
| 4,378,622 | 4/1983 | Pinkston et al. | 101/376 |
| 4,471,011 | 9/1984 | Sporing | 428/909 |
| 4,548,858 | 10/1985 | Meadows | 428/909 |
| 4,770,928 | 9/1988 | Gaworowski et al. | 101/401.1 |
| 4,897,440 | 1/1990 | Lo | 492/50 |
| 4,903,597 | 2/1990 | Hoage et al. | 101/375 |
| 5,006,400 | 4/1991 | Pinkston et al. | 428/909 |
| 5,205,213 | 4/1993 | Bresson | 101/217 |
| 5,245,923 | 9/1993 | Vrotacoe | 101/217 |
| 5,256,459 | 10/1993 | Carlson | 101/375 |
| 5,264,289 | 11/1993 | Kondo et al. | 428/909 |
| 5,304,267 | 4/1994 | Vrotacoe et al. | 156/86 |
| 5,316,798 | 5/1994 | Tittgemeyer | 427/409 |
| 5,323,702 | 6/1994 | Vrotacoe et al. | 101/217 |
| 5,352,507 | 10/1994 | Bresson et al. | 428/909 |
| 5,431,989 | 7/1995 | Beltzung et al. | 428/909 |
| 5,440,981 | 8/1995 | Vrotacoe et al. | 101/217 |
| 5,486,402 | 1/1996 | Flint et al. | 428/909 |
| 5,544,584 | 8/1996 | Thompson et al. | 101/401.1 |
| 5,644,985 | 7/1997 | Serain et al. | 101/401.1 |
| 5,860,360 | 1/1999 | Lane, III et al. | 101/376 |

FOREIGN PATENT DOCUMENTS

| | | |
|---|---|---|
| 448469 | 9/1991 | European Pat. Off. . |
| 520279 | 12/1992 | European Pat. Off. . |
| 545468 | 6/1993 | European Pat. Off. . |
| 715966 | 6/1996 | European Pat. Off. . |
| 727326 | 8/1996 | European Pat. Off. . |
| 58-114935 | 7/1983 | Japan . |
| 58-114936 | 7/1983 | Japan . |
| 124993 | 6/1987 | Japan ......... 428/909 |
| 1250912 | 10/1971 | United Kingdom . |
| 91/11330 | 8/1991 | WIPO ......... 428/909 |

*Primary Examiner*—Stephen R. Funk
*Attorney, Agent, or Firm*—Killworth, Gottman, Hagan & Schaeff, LLP

[57] ABSTRACT

A replaceable sleeve having a working surface is provided which is adapted to be mounted on a carrier. The sleeve includes an inner polymeric layer, a reinforcing layer overlying the inner layer, an intermediate polymeric layer overlying the reinforcing layer, and an outer polymeric layer. The sleeve may include a cushion layer between the intermediate layer and the outer layer. The layers comprising the sleeve are formed around a support and then cured simultaneously in a single step. The resulting sleeve may be used in printing operations or in other applications such as coating, embossing, laminating, calendering and the like.

16 Claims, 2 Drawing Sheets

REPLACEABLE SLEEVE

CROSS REFERENCE TO RELATED APPLICATIONS

This application is a continuation of U.S. application Ser. No. 08/758,808 filed Dec. 4, 1996 now U.S. Pat. No. 5,860,360.

BACKGROUND OF THE INVENTION

The present invention relates to a replaceable sleeve which may be readily mounted onto a cylindrical carrier, and more particularly, to a replaceable sleeve comprising a multilayer reinforced composite which may be cured in a single vulcanizing step.

Rubber-covered cylindrical rollers are widely used in industry for a number of applications, particularly for web or sheet handling and processing applications such as the embossing, calendering, laminating, printing and coating of paper, film, foil, and other materials. In addition to their use in web processing equipment, such rubber-covered rollers are often employed in conveyors and various office machines. Such rollers are typically comprised of a cylindrical (metal) core or other support with an outer covering of rubber, elastomer, or polymer material. However, after extended use, the covering on the rollers wears down and must be resurfaced or replaced. This typically requires that the rollers be sent to an outside source where the old surface is ground down and a new surface is applied. This is inconvenient and expensive as it requires that the processing equipment be shut down while the roller is being resurfaced or that the end user stock additional replacement rollers. Even in the latter instance, the rollers must be eventually sent out for resurfacing.

Cylindrical rollers are widely used in the printing industry. For example, printing rollers or sleeves are used in the flexographic printing industry for providing a mountable surface for flexographic printing plates. In a typical flexographic printing press, the sleeve is mounted onto a printing cylinder using pressurized air to expand the sleeve, and the printing plates are then attached to the outer surface of the sleeve.

While thin metal sleeves for use on printing cylinders have been employed in the past, more recently, printing sleeves have been developed which are comprised of polymeric materials. For example, printing sleeves are known which include laminated polymeric layers reinforced with a woven or nonwoven fabric layer. Such sleeves provide an advantage over metal rollers in that they are readily expandable for mounting on a cylinder, are seamless, and provide good structural integrity for printing operations without the damage and safety limitations of thin metal sleeves. However, such sleeves are typically expensive and slow to fabricate as each component must be formed and cured separately and then assembled or formed into a composite. Further, many polymeric printing sleeves in use require specific polymers and/or cure temperatures, which restricts the choice of materials or properties of the finished sleeve surface which may be desired for different printing applications.

Accordingly, there is still a need in the art for a replaceable sleeve which is readily mountable on a cylinder or other carrier, which may be fabricated quickly and easily, and which may be used in a wide variety of applications including printing applications as well as web or sheet handling or and/or processing applications and the like.

SUMMARY OF THE INVENTION

The present invention meets that need by providing a replaceable sleeve adapted to be mounted on a cylindrical carrier which is comprised of a multilayer composite and which may be used in a number of applications which typically utilize polymer covered rolls including but not limited to web or sheet handling operations and flexographic printing operations. The sleeve is efficiently produced as the layers comprising the sleeve may be cured simultaneously. The sleeve is essentially seamless, chemically resistant, and may be easily mounted on a variety of carriers. When used in printing operations, the sleeve provides high print quality and performs within the tolerance levels required by the printing industry.

According to one aspect of the present invention, a replaceable sleeve is provided which is adapted to be mounted on a carrier. By carrier, we mean any structure which functions to support the sleeve during use and allows it to rotate during use including but not limited to cylinders, tubes, and liners. The replaceable sleeve is made up of a combination of layers including an inner polymeric layer, a reinforcing layer overlying the inner layer, an intermediate polymeric layer overlying the reinforcing layer, and an outer polymeric layer forming a working surface, where the Shore A hardness of the inner polymeric layer is generally equal to or greater than the Shore A hardness of the intermediate and outer polymeric layers. By working surface, we mean that the outer surface of the sleeve may be adapted for a number of uses such as printing, embossing, coating, calendering, etc.

Preferably, the inner layer, intermediate layer, and outer layer are comprised of an elastomeric material selected from, but not limited to, the group consisting of butyl rubber, nitrile rubber, EPDM rubber, natural rubber, synthetic rubber, neoprene rubber, a blend of nitrile rubber and polyvinyl chloride, and polyurethane. Further, the inner layer, intermediate layer, and outer layer preferably have a Shore A durometer hardness of from about 30 to 90.

In a preferred embodiment, the inner layer has a Shore A hardness of at least about 70, and comprises, for example, a carboxylated nitrile-butadiene copolymer. The inner layer enhances the durability of the sleeve for repeated usage.

The reinforcing layer is preferably comprised of wound fibers of a material selected from the group consisting of polyester, cotton, fiberglass, cotton-wrapped polyester, rayon, carbon filaments, and other high modulus synthetic or organic fibers.

In a preferred embodiment of the invention, the sleeve further includes a cushion layer which may be positioned between the intermediate polymeric layer and the outer surface layer which functions to provide energy absorption and resiliency to the sleeve. The cushion layer may be comprised of an open or closed-cell polymeric foam or a polymer layer having a Shore A durometer hardness of from about 25 to 55.

The outer polymeric layer functions both as a protective layer for the cushion layer as well as providing a working surface having the particular characteristics needed for a specific end use. Preferably, each of the layers comprising the sleeve has a thickness of from about 0.001 to 0.750 inches (0.0025 cm to 1.905 cm).

The present invention also provides a method of making the replaceable sleeve of the present invention, which comprises the steps of forming an inner layer of a hard polymeric material into a cylindrical shape and mounting the layer on a support. A reinforcing layer is applied over the outer surface of the inner layer, and an intermediate polymeric layer is applied over the outer surface of the reinforcing layer. An outer polymeric layer may be applied over the outer surface of the intermediate polymeric layer. The layers are then cured simultaneously in a single step to form the sleeve. The layers are preferably cured at a temperature of between about 285° F. to 310° F. (140° C. to 154° C.) and for a time to effect vulcanization of all of the layers.

The method also includes the optional step of applying a cushion layer over the outer surface of the intermediate polymeric layer prior to applying the outer layer. Where the cushion layer is comprised of an open or closed-cell polymeric foam, the cellular structure may be formed in a separate step prior to aplying the outer layer.

The outer surface of the resulting sleeve may be further processed as desired to provide a working surface for specific applications. For example, the outer layer may be ground to provide a surface roughness which is suitable for applications such as coating, calendering, laminating, and the like, or which may be polished, etched or engraved to provide a surface which may be used for embossing or printing. The sleeve may be readily mounted and dismounted from a carrier using pressurized air. In addition to the printing and coating applications described above, the sleeve may be used in any other applications which require the use of a polymer covered roller, such as flood/solid color print rolls, meter rolls, nip rolls, support rolls, and the like.

Accordingly, it is a feature of the present invention to provide a replaceable sleeve having a working surface which may be readily mounted on a carrier, which is easily fabricated, and which may be used in a variety of applications. This, and other features and advantages of the present invention will become apparent from the following detailed description, the accompanying drawings, and the appended claims.

DETAILED DESCRIPTION OF THE PREFERRED EMBODIMENT

The replaceable sleeve of the present invention provides several advantages over other prior sleeves that are covered with rubber or polymer in that all of the layers comprising the sleeve are seamless and may be cured in a single step, which allows the sleeve to be produced more efficiently. And, because the layers comprising the sleeve are not limited to the use of specific polymers or curing methods, the properties of the sleeve may be tailored as desired for specific applications. For example, where the sleeve is used in printing operations, the outer layer of the sleeve may be finished so that it can be used as the printing surface, thus eliminating the requirement for the attachment of separate printing plates. The sleeve of the present invention also offers the advantage that it may be easily replaced on-site without having to shut down processing equipment for extended periods of time. That is, when the sleeve surface becomes worn or otherwise needs replacement, the sleeve may be readily dismounted from its carrier, and a new sleeve quickly mounted in its place.

Figure 1:
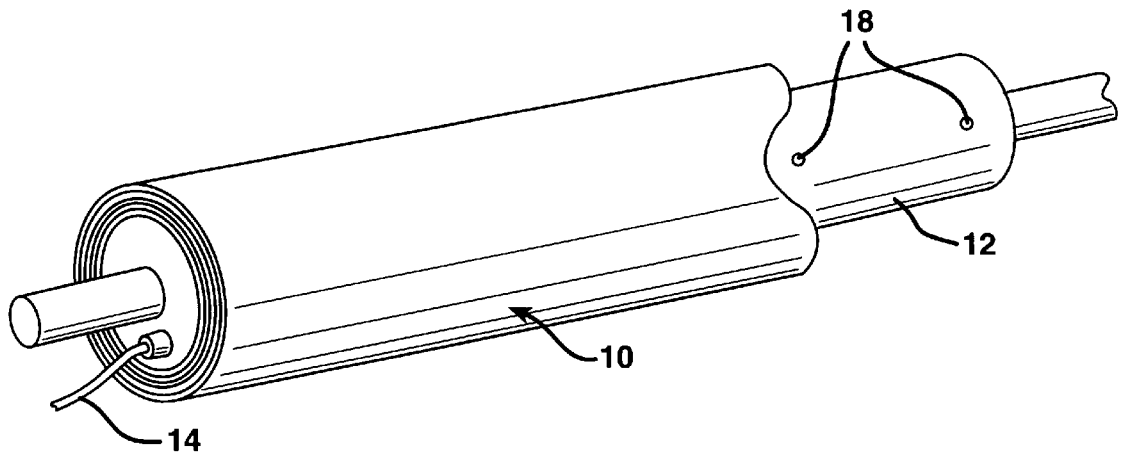
FIG. 1 is a perspective view, partially sectioned, of the replaceable sleeve of the present invention mounted on a printing cylinder.
Figure 2:
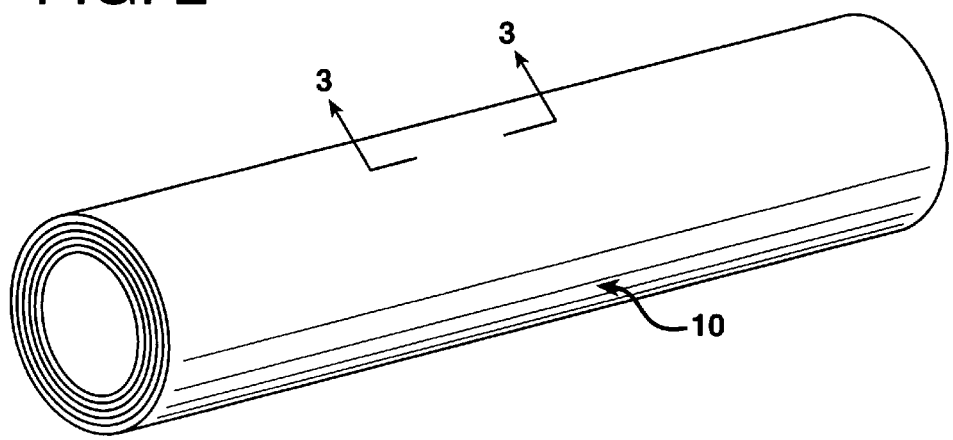
FIG. 2 is a perspective view of the replaceable sleeve of FIG. 1.

Referring now to FIGS. 1 and 2, the replaceable sleeve 10 of the present invention is shown. As shown in FIG. 1, the sleeve 10 is mounted on a conventional printing cylinder 12. However, it will be apparent to those skilled in the art that the sleeve may be adapted to be mounted on a variety of other carriers. In one method, cylinder 12 is hollow and may include an interior chamber (not shown) which is used as a compressed air chamber through which air may be passed for expanding the sleeve 10 during mounting and dismounting operations. The cylinder may include a plurality of spaced apart, radially-extending apertures 18 from which air in the chamber may exit to or which may be used to expand the sleeve 10 during mounting and dismounting operations. The air is introduced into the chamber by an air hose 14 which can communicate with the apertures of the cylinder 12. The sleeve is typically mounted onto the cylinder by introducing air at a pressure of about 80–120 psi (5.6 to 8.4 kg/cm$^2$) to expand the sleeve and permit it to be slipped onto the cylinder.

Figure 3:
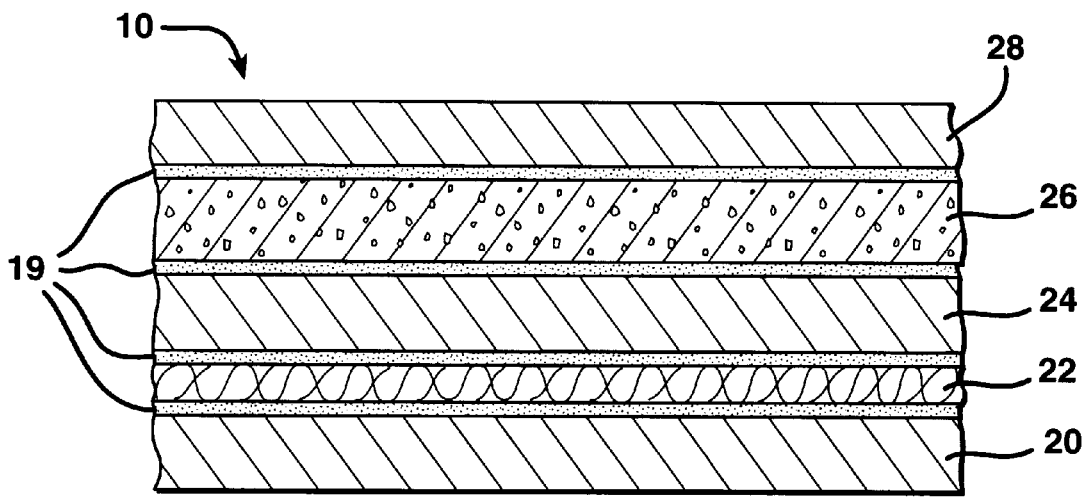
FIG. 3 is a sectional view taken along lines 2—2 of FIG. 2.
Figure 3A:
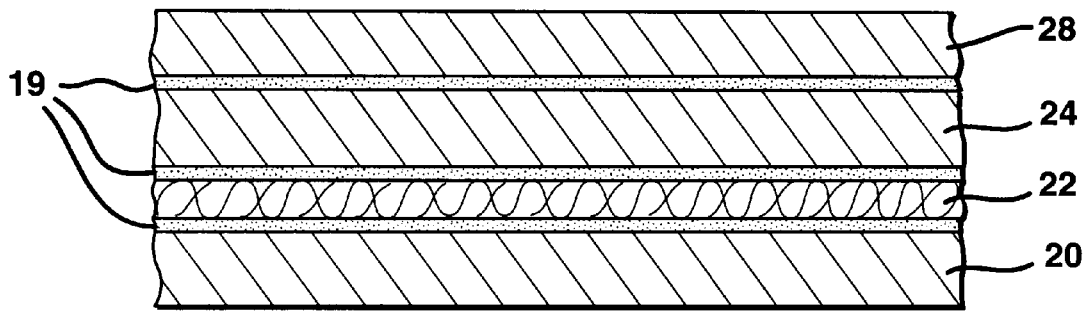
FIG. 3A is a sectional view of an alternative embodiment of the replaceable sleeve without a cushion layer.

FIG. 3A illustrates the layers comprising sleeve 10 including an inner polymeric layer 20, a reinforcing layer 22 overlying inner layer 20, an intermediate polymeric layer 24 overlying reinforcing layer 22, and an outer polymeric layer 28. As shown, in FIG. 3 the sleeve may optionally include a cushion layer 26 between outer layer 28 and intermediate layer 24. Any suitable rubber adhesives 19 may be used to bond the layers together during vulcanization including but not limited to CHEMLOK™, commercially available from Lord Corporation.

The inner, intermediate, and outer polymeric layers of the sleeve may be comprised of a number of different polymers including butyl rubber, EPDM rubber, nitrile rubber, natural rubber, neoprene rubber, a blend of nitrile and polyvinyl chloride, polyurethane, and synthetic rubber. Suitable synthetic rubbers include HYPALON™, a chlorosulfonated polyethylene available from DuPont. Inner polymeric layer 20 is preferably comprised of a carboxylated nitrile copolymer, which has a Shore A durometer hardness of between about 65 to 90 after vulcanization. The hardness and toughness of the inner layer provides abrasion resistance to the sleeve and forms a sufficiently stable structure which provides support for the remaining layers of the sleeve.

Reinforcing layer 22 provides additional dimension and support to the sleeve, and is preferably comprised of wound fibers such as polyester, cotton, fiberglass, cotton-wrapped polyester, rayon, carbon filaments, or other high modulus synthetic or organic fibers. Suitable synthetic fibers include aramid fibers available from DuPont under the designation KEVLAR® and fiberglass or polyester threads available from a variety of sources. Preferred for use in the present invention are fiberglass fibers which have been twisted into a cord or thread.

Cushion layer 26 provides cushion to the outer surface layer of the sleeve. In instances where the sleeve is used in printing operations, the cushion layer also provides cushion to the printing plate that may be adhered to it. The cushion layer typically comprises an open-celled polymeric foam or a layer of a soft polymer having a Shore A durometer hardness of from about 25 to 55.

In the preferred method of making the sleeve of the present invention, inner polymeric layer 20 is formed by either an extrusion process in which the desired polymer is extruded as a cylindrical tube through an extrusion die, or by calendering layers of the polymer onto a mandrel. If the inner layer is formed by extrusion into a tube, it is subsequently mounted onto a mandrel by expansion with blown air. The mandrel is typically cylindrically-shaped and may include a hollow internal chamber and a plurality of holes on its outer surface to allow the passage of pressurized air.

After the inner polymeric layer has been mounted or formed on the mandrel, it remains in an uncured state. An adhesive is then preferably applied to the inner layer to form an adhesive layer 19 prior to the application of reinforcing layer 22. The reinforcing layer, which preferably comprises fiberglass or polyester twisted cord, is then applied to the inner layer 20 by winding under tension and wrapped around the layer at approximately 20 to 35 threads per linear inch. Another layer of adhesive is then preferably applied over the reinforcing layer.

Intermediate layer 24 may be formed in the same manner as inner layer 20, either by extrusion or calendering to produce a substantially void-free layer as shown in FIG. 3. If formed by extrusion, the intermediate layer is then mounted by expansion with blown air onto the sleeve over adhesive layer 19.

In embodiments where cushion layer 26 is included in the structure, another layer of adhesive may be applied over the intermediate layer prior to application of the cushion layer. The cushion layer may be formed by conventional means known in the art, and is preferably formed by extruding the desired polymer with chemical blowing agents which are activated during vulcanization. Suitable chemical blowing agents include magnesium sulfate, hydrated salts, hydrazides such as p-toluene sulfonyl hydrazide and p,poxybisbenzene, sulfonyl hydrazide, and carbonamides such as 1,1'-azobisformamide. Nitrate, nitrite, bicarbonate and carbonate salts may also be used. Alternatively, the cushion layer may be formed in a separate step as disclosed in commonly-assigned U.S. Pat. No. 4,548,858 to Meadows, the disclosure of which is hereby incorporated by reference. In another alternative embodiment, the cushion layer may be formed by mixing a suitable salt such as hydrated magnesium sulfate with a polymeric material such as rubber and then curing and leaching the salt out, forming cavities in the rubber. Such a process is disclosed in commonly assigned U.S. Pat. No. 3,928,521 to Haren et al, the disclosure of which is hereby incorporated by reference. Still another method of forming the cushion layer includes the incorporation of microcapsules in an elastomeric matrix and fixing those microcapsules in a low temperature partial vulcanization step as described in U.S. Pat. No. 4,770,928 to Gaworoski, the disclosure of which is hereby incorporated by reference.

Outer polymeric layer 28 is then formed, either by extrusion or calendering as described above, and then mounted over the cushion layer. A layer of adhesive may be applied to the cushion layer prior to application of the outer layer.

The sleeve assembly is then preferably cured (at a temperature of between about 285° F. to 310° F. (140° C. to 154° C.)), for a time sufficient to completely vulcanize each layer in the sleeve in a single step. For sleeves of relatively small dimension, a curing time of only about 45 minutes may be needed, while for larger sleeves, a curing time of more than 6 hours may be required. This flexibility provides an advantage over previous methods which require the same amount of curing time regardless of the size of the sleeve.

It should be appreciated that while the sleeve described herein preferably includes inner, intermediate, and outer polymeric layers as well as a reinforcing layer and optional cushion layer, the sleeve may also be constructed so that it comprises only the inner layer, or only the inner layer, reinforcing layer, and intermediate layer. The sleeve may also be fabricated to include only the inner layer, reinforcing layer, intermediate layer and cushion layer. Other variations of the layers comprising the sleeve are possible and within the scope of the invention, as long as the sleeve includes the inner hard polymeric layer.

The outer surface of the cured sleeve may then be finished as desired by conventional means such as grinding and polishing to provide proper surface conditions for printing or other applications. In printing operations where printing plates are to be mounted on the sleeve, the surface is preferably ground so as to achieve a surface roughness of about 20 to 100 microinches ($5 \times 10^{-5}$ cm to $2.5 \times 10^{-4}$ cm). If the outer surface layer of the sleeve is to be used as a printing surface, the sleeve is preferably super polished to provide a finish of from about 5 to 35 microinches ($1.25 \times 10^{-5}$ cm to $8.9 \times 10^{-5}$ cm). The resulting sleeve is capable of meeting tolerances required in the printing industry.

For other applications, the outer surface of the sleeve may further be mechanically or chemically etched or laser engraved to provide a suitable surface for transferring ink images onto a substrate, or for other uses such as texturing, embossing, coating etc. It should be appreciated that the properties of the sleeve may be tailored as desired by modifying the materials used for each layer, as well as by modifying the layer thickness and curing method.

The sleeve of the present invention can be readily mounted onto or dismounted from any typical carrier such as cylinders, tubes, liners, etc. In addition to printing operations, the sleeve of the present invention may be used for any other applications which typically utilize a polymer covered roll including coating, tinting, embossing, laminating, impression, nip, and backup rolls.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A replaceable sleeve adapted to be mounted on a carrier comprising:
   a) an inner polymeric layer;
   b) a reinforcing layer comprised of fibers, said reinforcing layer overlying said inner layer and being adhered directly thereto;
   c) a substantially void-free intermediate polymeric layer overlying said reinforcing layer and being adhered directly thereto; and
   d) an outer polymeric layer forming a working surface; wherein said inner polymeric layer has a Shore A hardness which is equal to or greater than the Shore A hardness of said intermediate and outer polymeric layers.

2. The replaceable sleeve of claim 1 in which each of said layers has a thickness of from about 0.005 to 0.750 inches.

3. The replaceable sleeve of claim 1 in which said layers have been cured in a single vulcanizing step.

4. The replaceable sleeve of claim 1 wherein said sleeve is seamless.

5. The replaceable sleeve of claim 1 in which said inner layer, said intermediate layer, and said outer layer are comprised of materials selected from the group consisting of butyl rubber, nitrile rubber, EPDM rubber, natural rubber, synthetic rubber, neoprene rubber, blends of nitrile rubber and polyvinyl chloride, and polyurethane.

6. The replaceable sleeve of claim 1 in which said inner layer comprises a carboxylated nitrile-butadiene copolymer.

7. The replaceable sleeve of claim 1 in which said inner layer, said intermediate layer and said outer layer have a Shore A durometer hardness of from about 20 to 90.

8. The replaceable sleeve of claim 1 in which said inner layer has a Shore A durometer hardness of at least about 70.

9. The replaceable sleeve of claim 1 in which said reinforcing layer is comprised of a material selected from the group consisting of polyester, cotton, fiberglass, cotton-wrapped polyester, rayon, carbon filaments, and other high modulus synthetic or organic fibers.

10. A method of making a replaceable sleeve adapted to be mounted on a carrier comprising the steps of:

forming an inner polymeric layer in a cylindrical shape;

mounting said inner layer onto a support;

applying a reinforcing layer comprised of fibers over an outer surface of said inner layer and adhering said reinforcing layer directly thereto;

applying an intermediate polymeric layer over an outer surface of said reinforcing layer and adhering said intermediate polymeric layer directly thereto;

applying an outer polymeric layer directly over an outer surface of said intermediate polymeric layer; and curing said layers to form said sleeve; wherein said inner polymeric layer has a Shore A hardness which is equal to or greater than the Shore A hardness of said intermediate and outer polymeric layers.

11. The method of claim 10 in which said layers are cured at a temperature of between about 285° F. to 310° F.

12. The method of claim 10 in which said inner layer, said intermediate layer, and said outer layer are comprised of a material selected from the group consisting of butyl rubber, nitrile rubber, EPDM rubber, natural rubber, synthetic neoprene rubber, a blend of nitrile rubber and polyvinyl chloride, and polyurethane.

13. The method of claim 10 in which said inner layer, said intermediate layer and said outer layer have a Shore A durometer hardness of from about 20 to 90.

14. The method of claim 10 in which said inner layer has a Shore A durometer hardness of at least about 70.

15. In combination, a replaceable sleeve and carrier, said sleeve comprising:

a) an inner polymeric layer;

b) a reinforcing layer comprised of fibers, said reinforcing layer overlying said inner layer and being adhered directly thereto;

c) a substantially void-free intermediate polymeric layer overlying said reinforcing layer and being adhered directly thereto; and d) an outer polymeric layer; wherein said inner polymeric layer has a Shore A hardness which is equal to or greater than the Shore A hardness of said intermediate and outer polymeric layers, said sleeve being mounted on said carrier and being readily separable from said carrier.

16. A replaceable sleeve adapted to be mounted on a carrier comprising:

a) an inner polymeric layer comprising a carboxylated nitrile-butadiene copolymer;

b) a reinforcing layer comprised of fibers, said reinforcing layer overlying said inner layer and being adhered directly thereto;

c) a substantially void-free intermediate polymeric layer overlying said reinforcing layer and being adhered directly thereto; and d) an outer polymeric layer forming a working surface.

\* \* \* \* \*